Jan. 9, 1934.  W. L. VAN NESS  1,943,195
GLASS WORKING APPARATUS
Filed Dec. 18, 1928   13 Sheets-Sheet 1
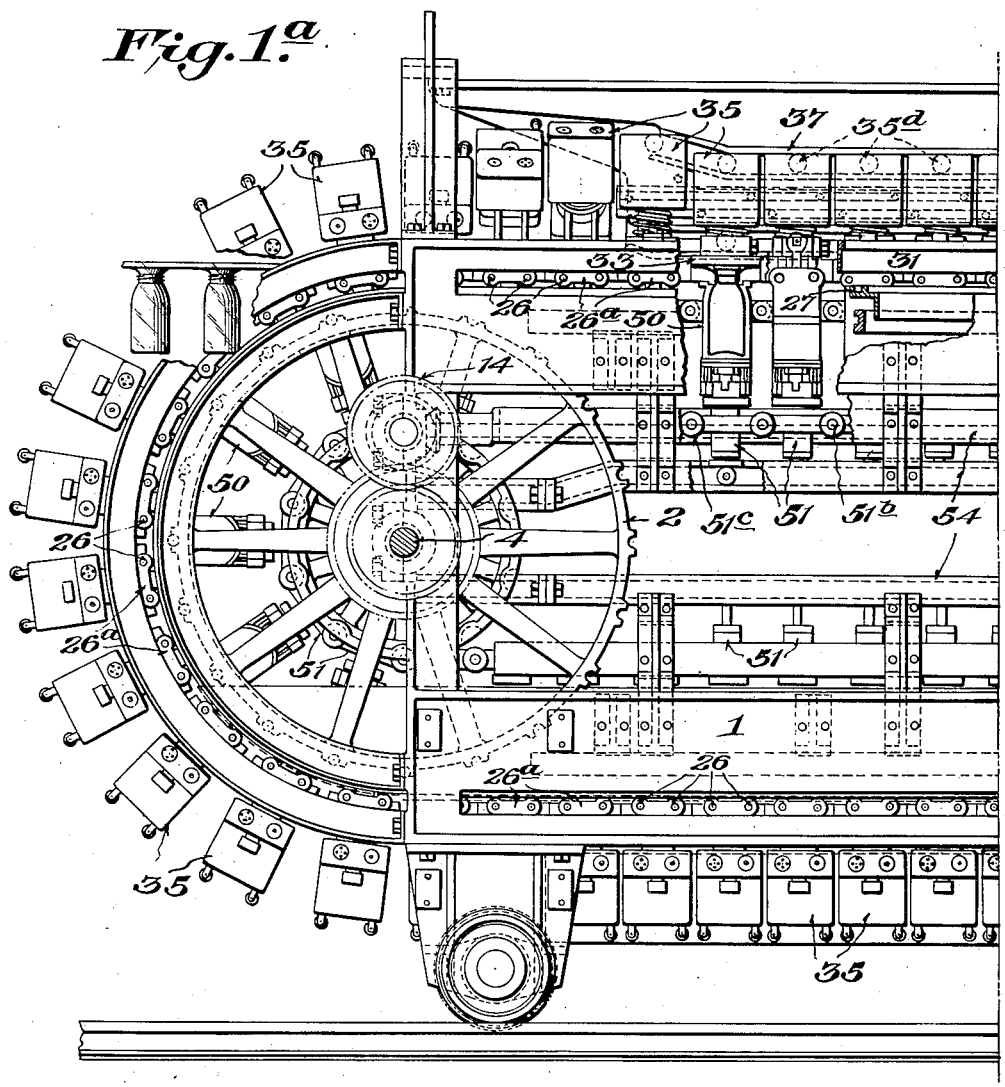
Fig.1.ᵃ
Inventor
Willard L. Van Ness,
By
Attorneys.

Jan. 9, 1934. W. L. VAN NESS 1,943,195
GLASS WORKING APPARATUS
Filed Dec. 18, 1928 13 Sheets-Sheet 2
Fig.1ᵇ
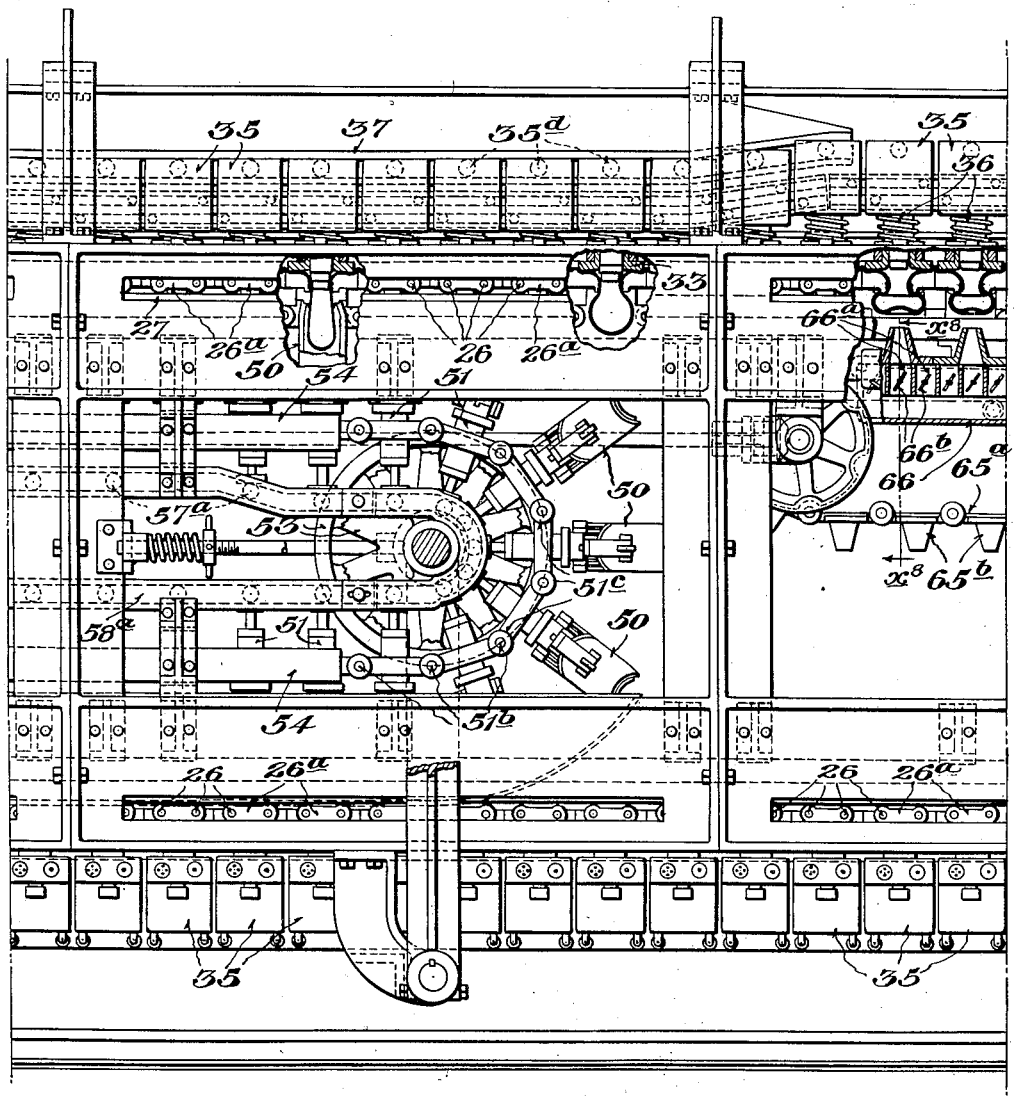
Inventor
Willard L. Van Ness,
By [signature]
Attorneys

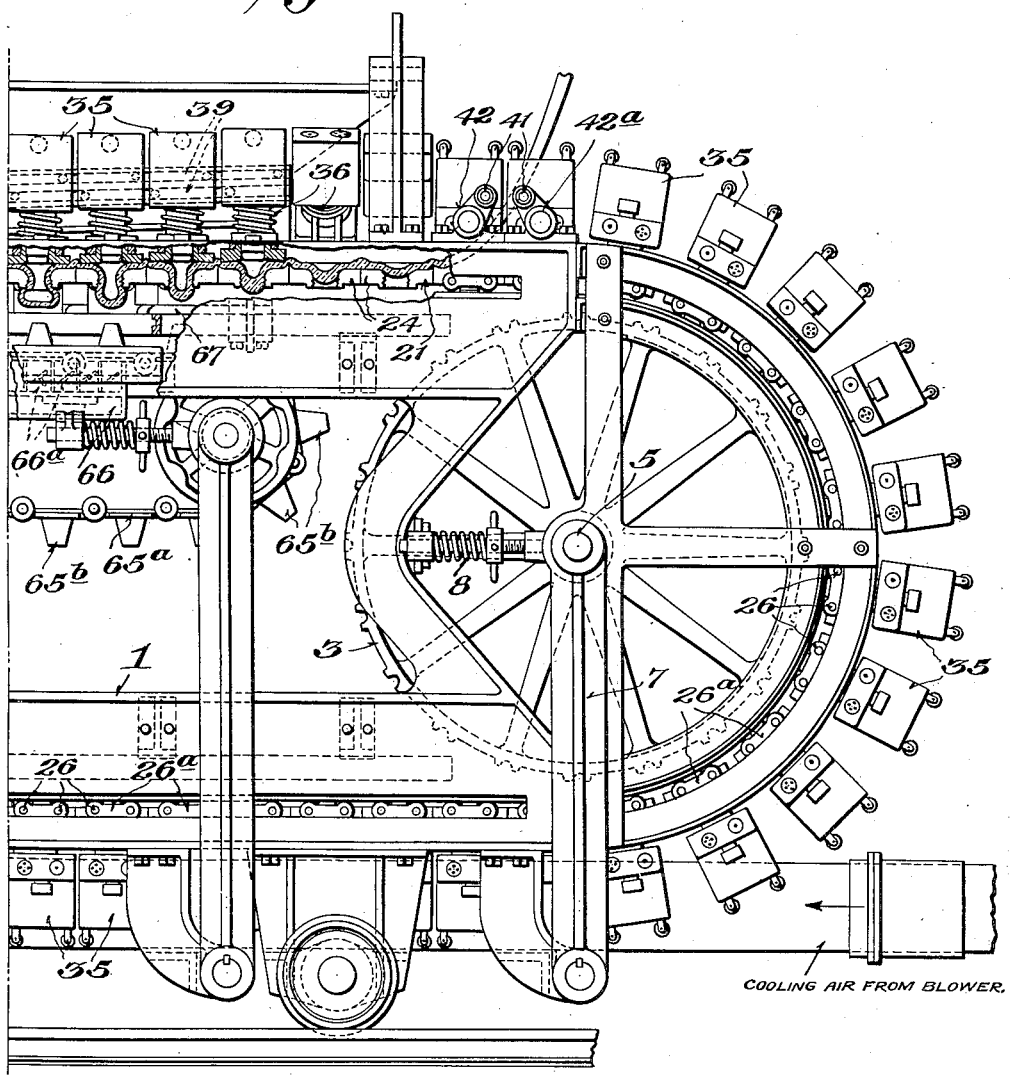

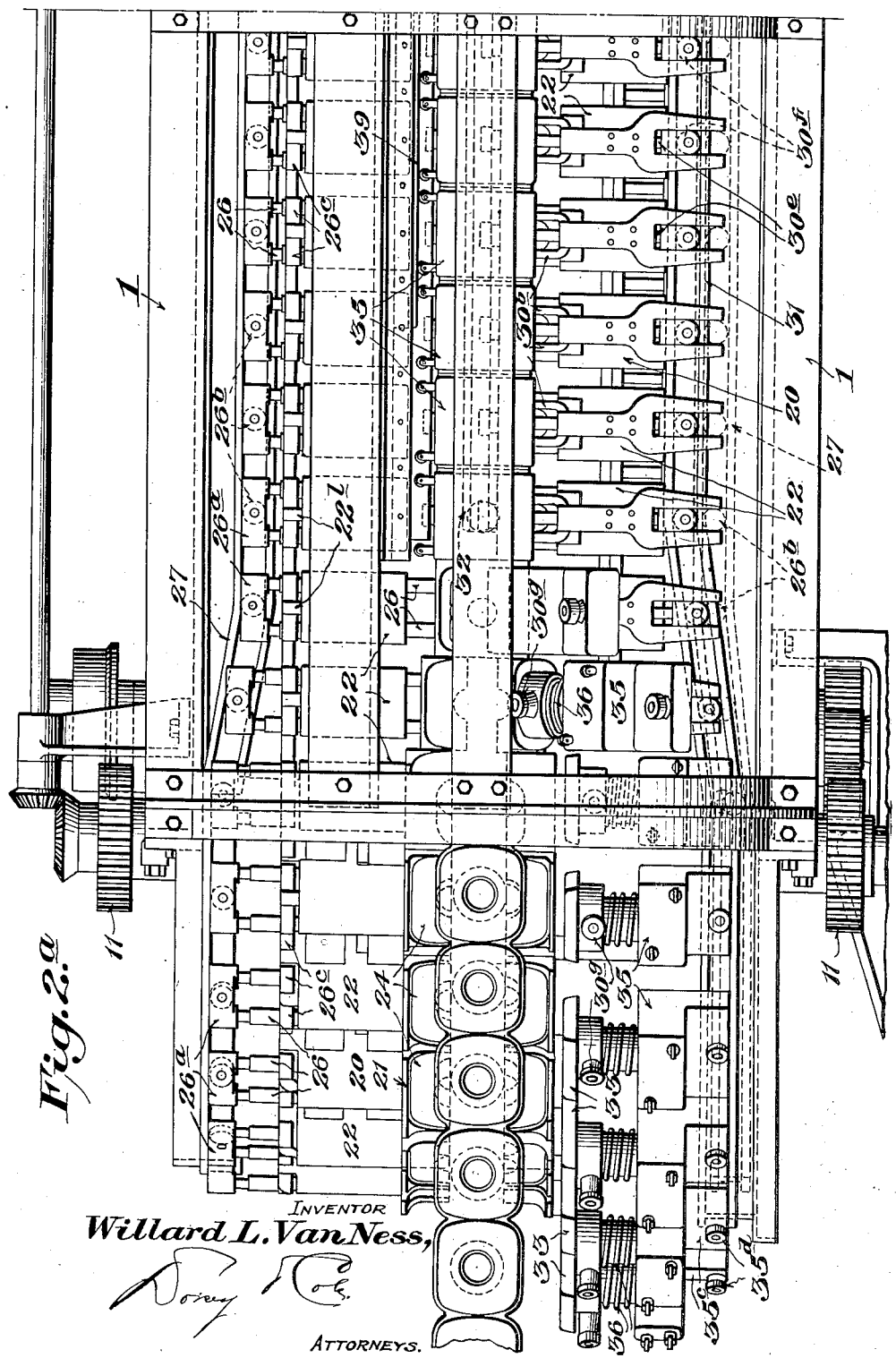

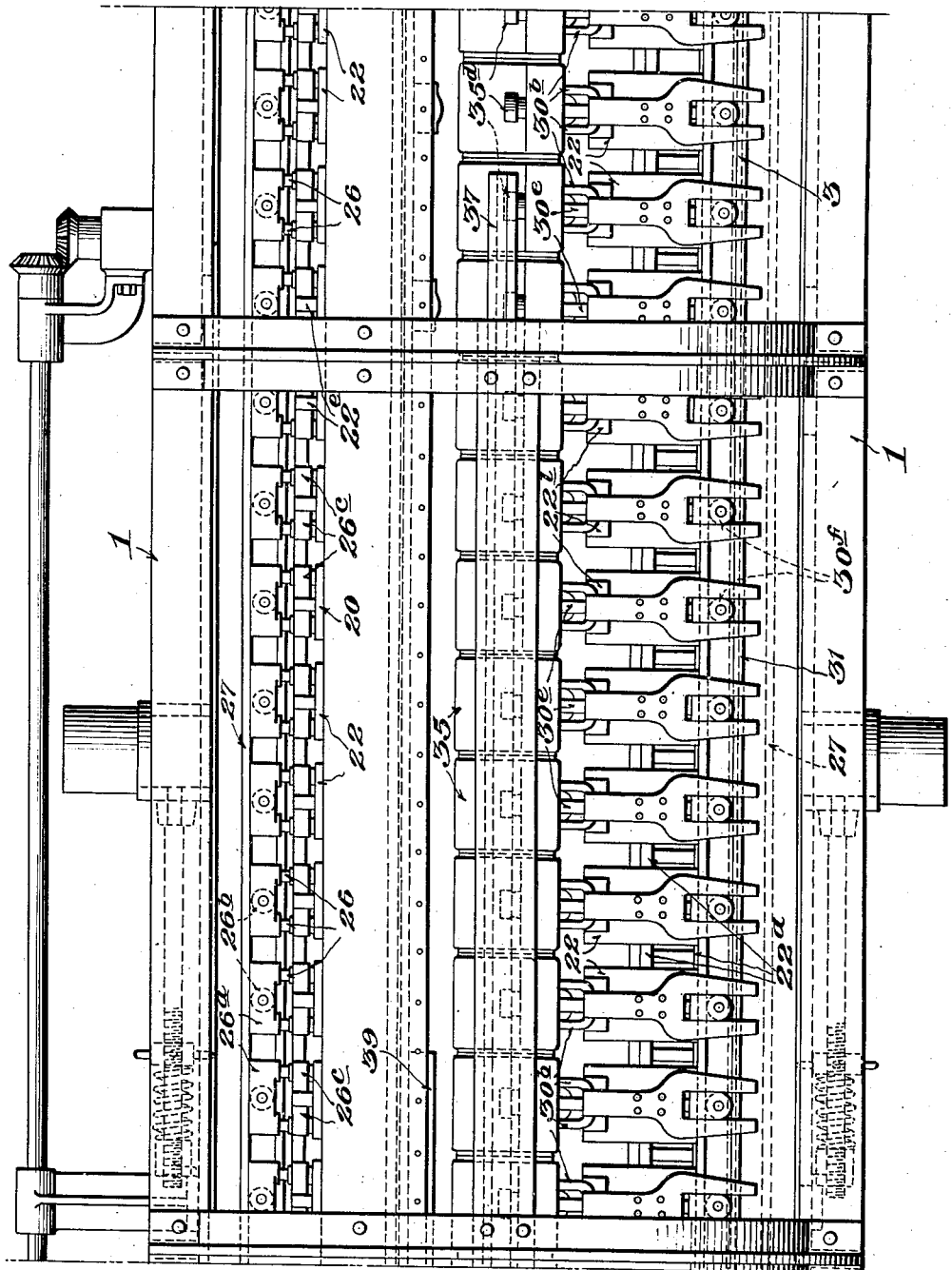

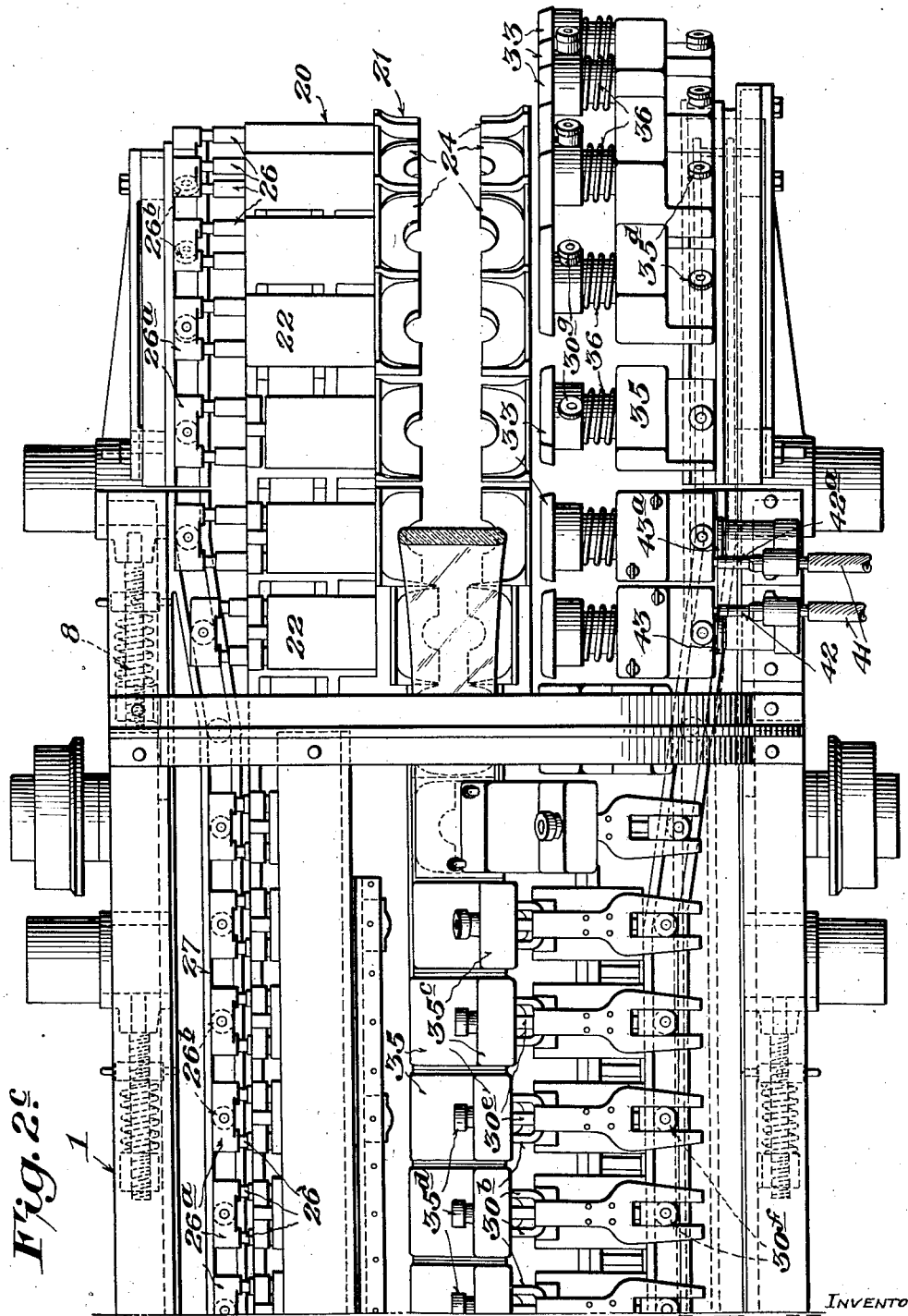

Jan. 9, 1934.   W. L. VAN NESS   1,943,195
GLASS WORKING APPARATUS
Filed Dec. 18, 1928   13 Sheets-Sheet 7

Inventor
Willard L. Van Ness,
By
Attorney

Jan. 9, 1934.   W. L. VAN NESS   1,943,195
GLASS WORKING APPARATUS
Filed Dec. 18, 1928   13 Sheets-Sheet 8
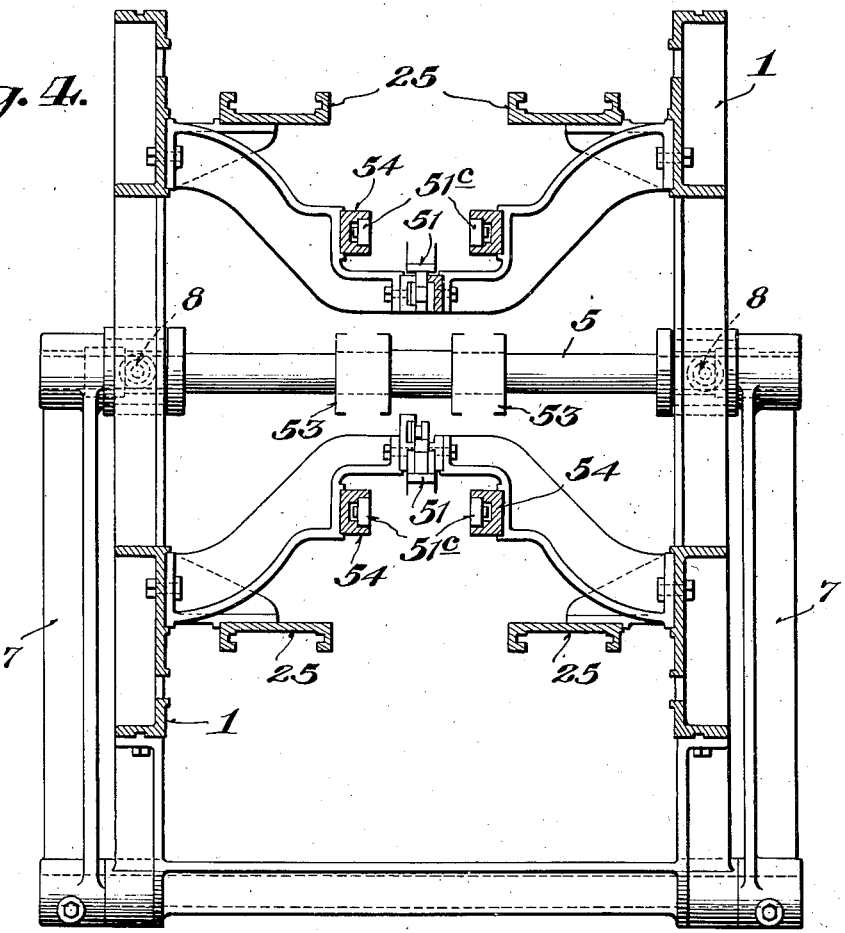
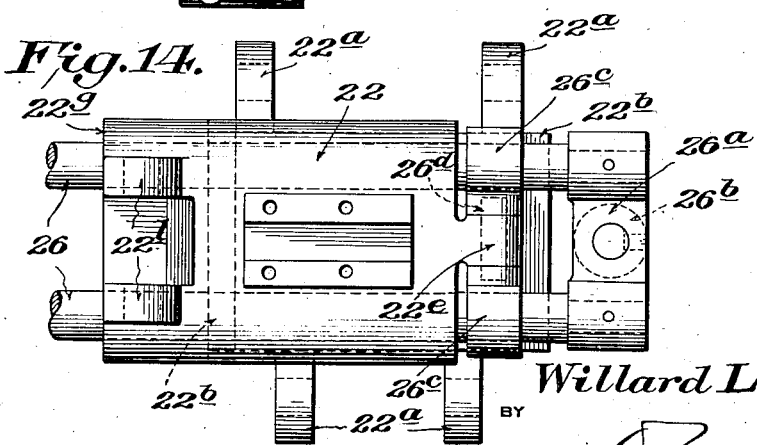
INVENTOR
Willard L. Van Ness,
BY
ATTORNEYS

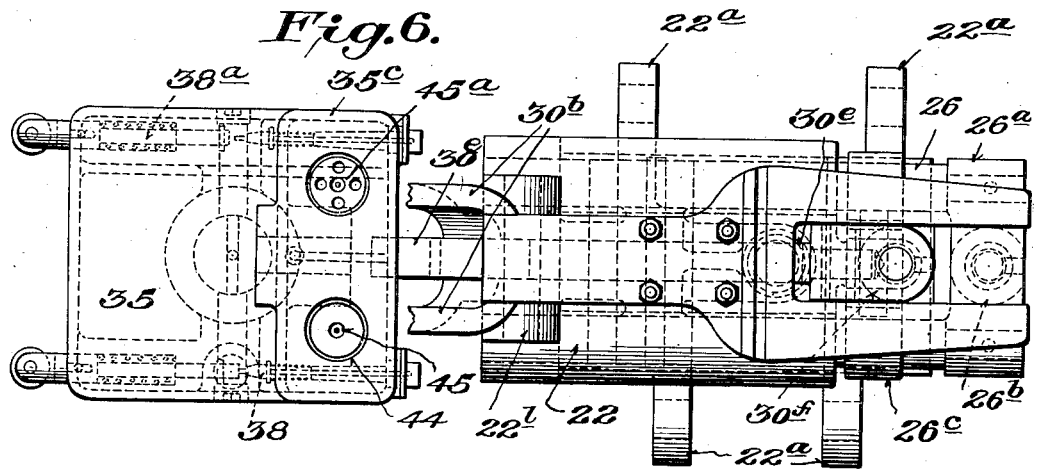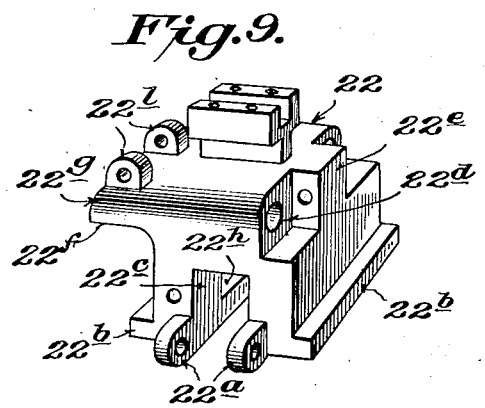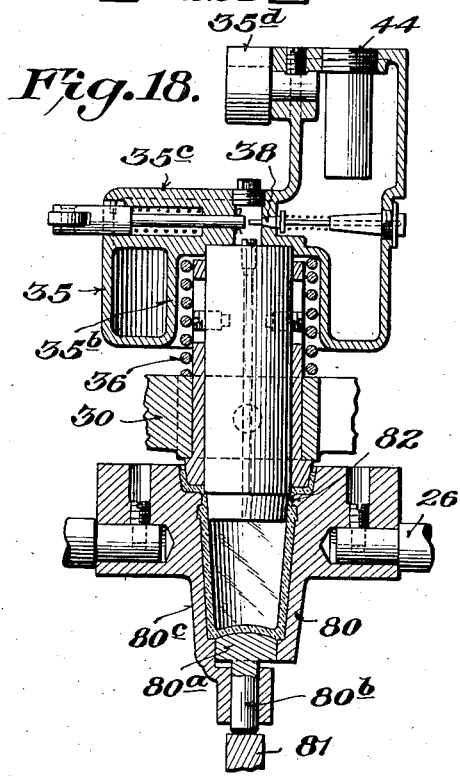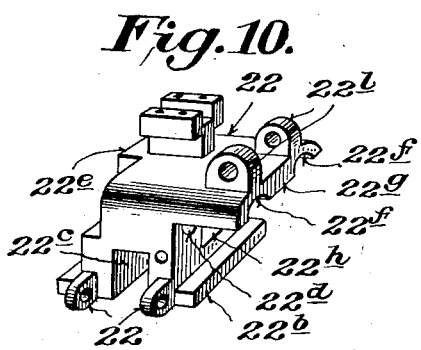

Jan. 9, 1934.    W. L. VAN NESS    1,943,195
GLASS WORKING APPARATUS
Filed Dec. 18, 1928    13 Sheets-Sheet 11

INVENTOR
Willard L. Van Ness,
BY
ATTORNEYS

Jan. 9, 1934.  W. L. VAN NESS  1,943,195
GLASS WORKING APPARATUS
Filed Dec. 18, 1928  13 Sheets-Sheet 12
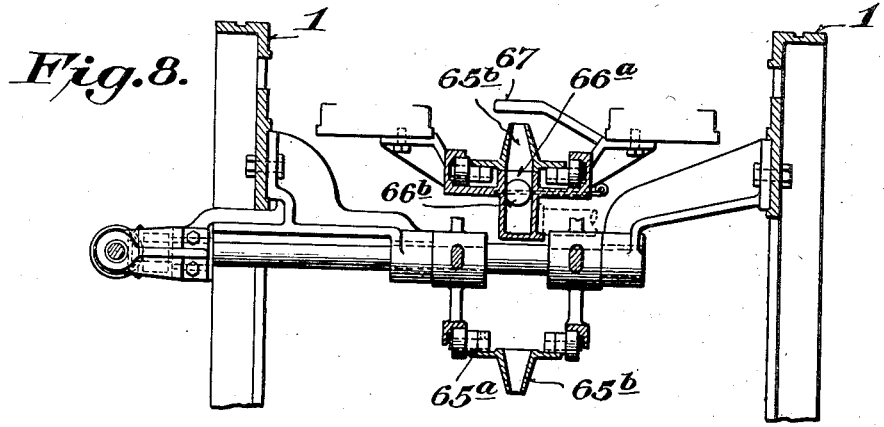
Fig. 8.
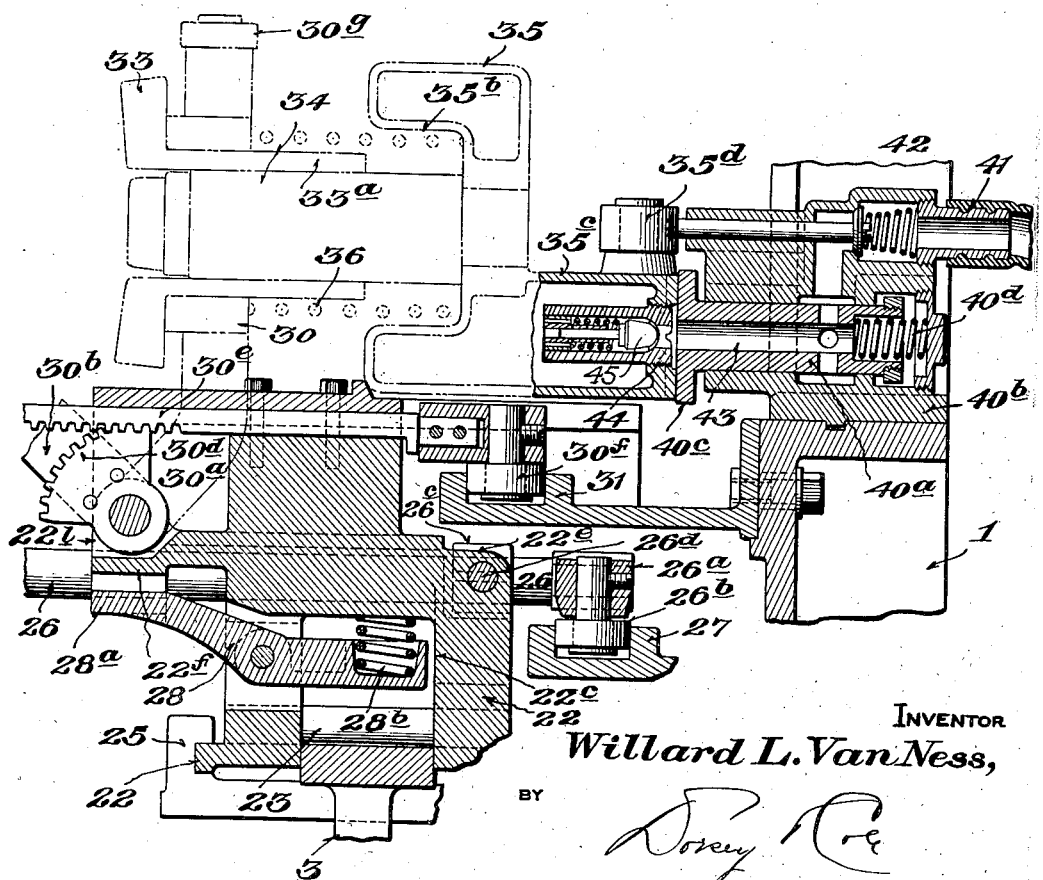
Fig. 8ᵃ
Inventor
Willard L. Van Ness,
BY
ATTORNEYS

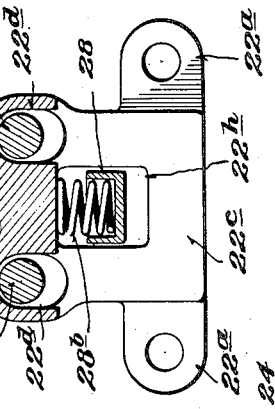
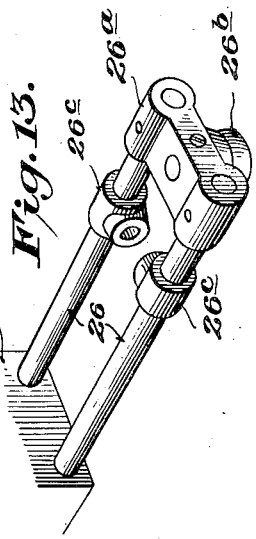
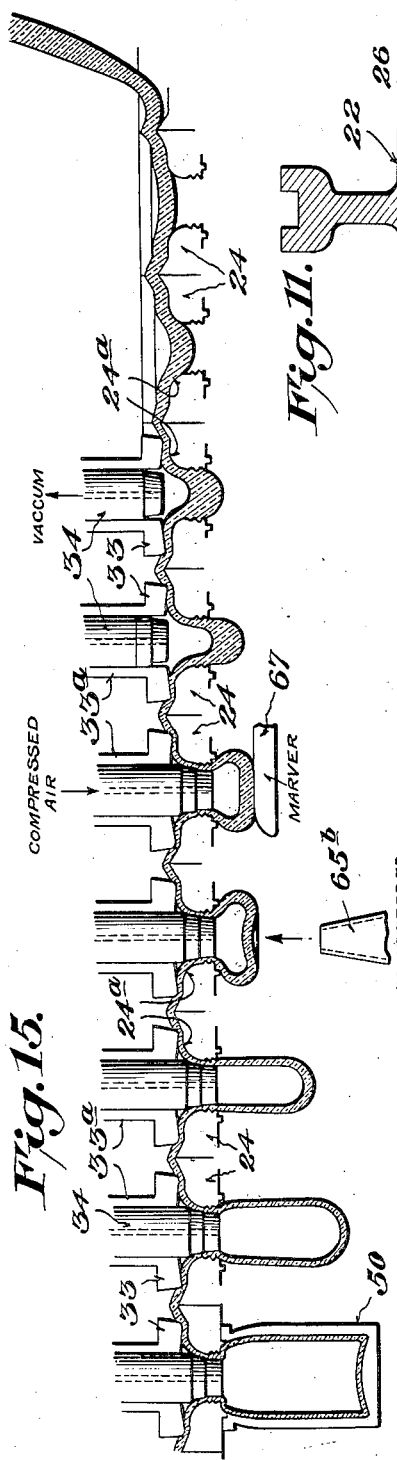
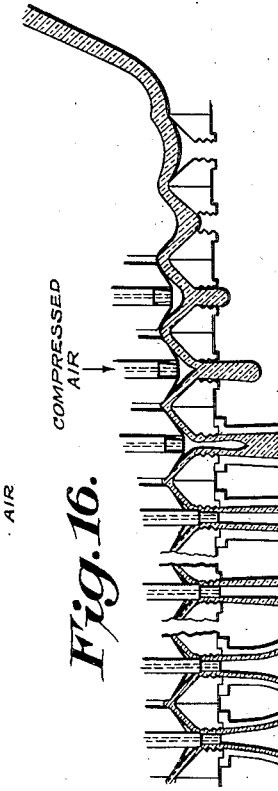
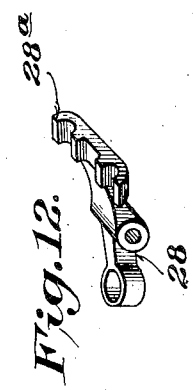

Patented Jan. 9, 1934

1,943,195

UNITED STATES PATENT OFFICE 1,943,195

GLASS WORKING APPARATUS

Willard L. Van Ness, Toledo, Ohio, assignor to Corning Glass Works, Corning, N. Y.

Application December 18, 1928
Serial No. 326,735

20 Claims. (Cl. 49—5)

My present invention relates to a glass working machine which, while embodying an endless glass conveying apron, (preferably fed by a ribbon of glass) and glass working units moving in unison with the conveying apron during their operative run, all of which is disclosed in British Patent 276,606, differs therefrom in important features by which certain advantages are obtained in the production of certain lines of ware. Thus this invention is characterized by an endless and continuous glass conveyor moving in a closed path and consisting of articulated elements adapted to receive glass preferably in the form of a continuous ribbon and having a series of orifices therein through which the glass may sag, associated with some or all of the following features:

1. Glass working mechanism, for each orifice, mounted on the elements of the conveyor, and movable to an operative position over the bed of the conveyor, and to a position from over the bed to permit glass to be deposited thereon.

2. Mold mechanisms either formed in part or in whole as a part of the conveyor. In the former case parts of the molding surfaces are mounted on a second belt to move, during the operative run of the molds, in registration with and below the corresponding orifices of the conveyor to shape the glass depending from the orifices. An instance of the latter case is where the entire mold is carried on the conveyor.

3. Air reservoirs associated with and carried by the glass working units and moving therewith in the travel of the conveyor, which reservoirs in their travel are charged with a predetermined volume of air under predetermined pressure to be released at proper times to effect the shaping of the glass.

4. The conveyor consists of two link belts, each belt carrying a series of half-apron plates, with mechanism for moving the plates laterally and towards and away from the medial line of the machine and in respect to the belts by which they are carried.

It further consists in the combination and arrangements of the several instrumentalities of which it is composed and of the construction of the same, as will be hereinafter described and claimed.

Referring to the accompanying drawings in which corresponding parts are designated by similar marks of reference,—

Figs. 1ª, 1ᵇ and 1ᶜ are, respectively, side elevations partly in section of the delivery and the loading ends of a machine embodying my invention.

Figs. 2ª, 2ᵇ and 2ᶜ are plan views of the machine shown respectively in Figures 1ª, 1ᵇ, and 1ᶜ.

Fig. 4 is a transverse vertical section through the frame of the machine of the preceding figures and certain cam-ways.

Fig. 6 is a plan view of mechanism shown in Fig. 5.

Fig. 8 is a detailed fragmental section taken on the line $X^8$—$X^8$ of Fig. 1ᵇ.

Fig. 8ª is a fragmental section showing the manner of supplying air to the air heads.

Figs. 9 and 10 are perspective views of a link block.

Fig. 11 is a longitudinal vertical section through a link block.

Fig. 12 is a perspective view of a bearing block pivoted to and carried on a link block and supporting an apron plate.

Fig. 13 is a perspective view of a pair of slides carrying an apron plate.

Fig. 14 is a plan view of a link block with certain of the parts carried thereby.

Fig. 15 is a diagrammatic view illustrating the formation of a fruit jar on a machine such as shown in the preceding figures.

Fig. 16 is a diagrammatic view showing the application of the invention herein disclosed to the manufacture of hollow ware by parison and finishing molds.

Figure 17:
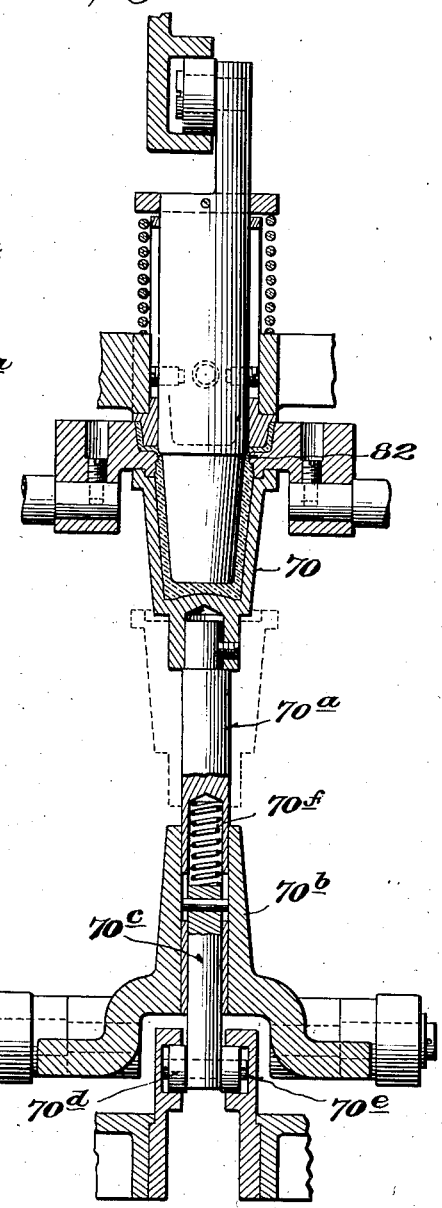

Figs. 17 and 18 are details showing applications of the invention herein disclosed to the manufacture of ware in stripping molds.

The several instrumentalities herein after described are mounted on and carried by a frame 1 comprising two side members properly braced and connected together in such a manner that the space between the two side members is free to receive and permit the movements of the several elements. This frame in preferably long in relation to its width, and carries at each of its opposite ends and on each side of the longitudinal axis of the machine sprocket wheels 2, 2—$a$ and 3, 3—$a$. The two wheels 2, 2—$a$ or 3, 3—$a$ at the same end of the machine are sleeved on a transverse shaft 4 or 5, the shaft 4 at the delivery end being carried in bearings 6 rigidly mounted in the frame, while the shaft 5 at the receiving end of the machine is mounted in pivoted arms 7, which are pressed by springs 8 away from the shaft 4.

Figure 3:
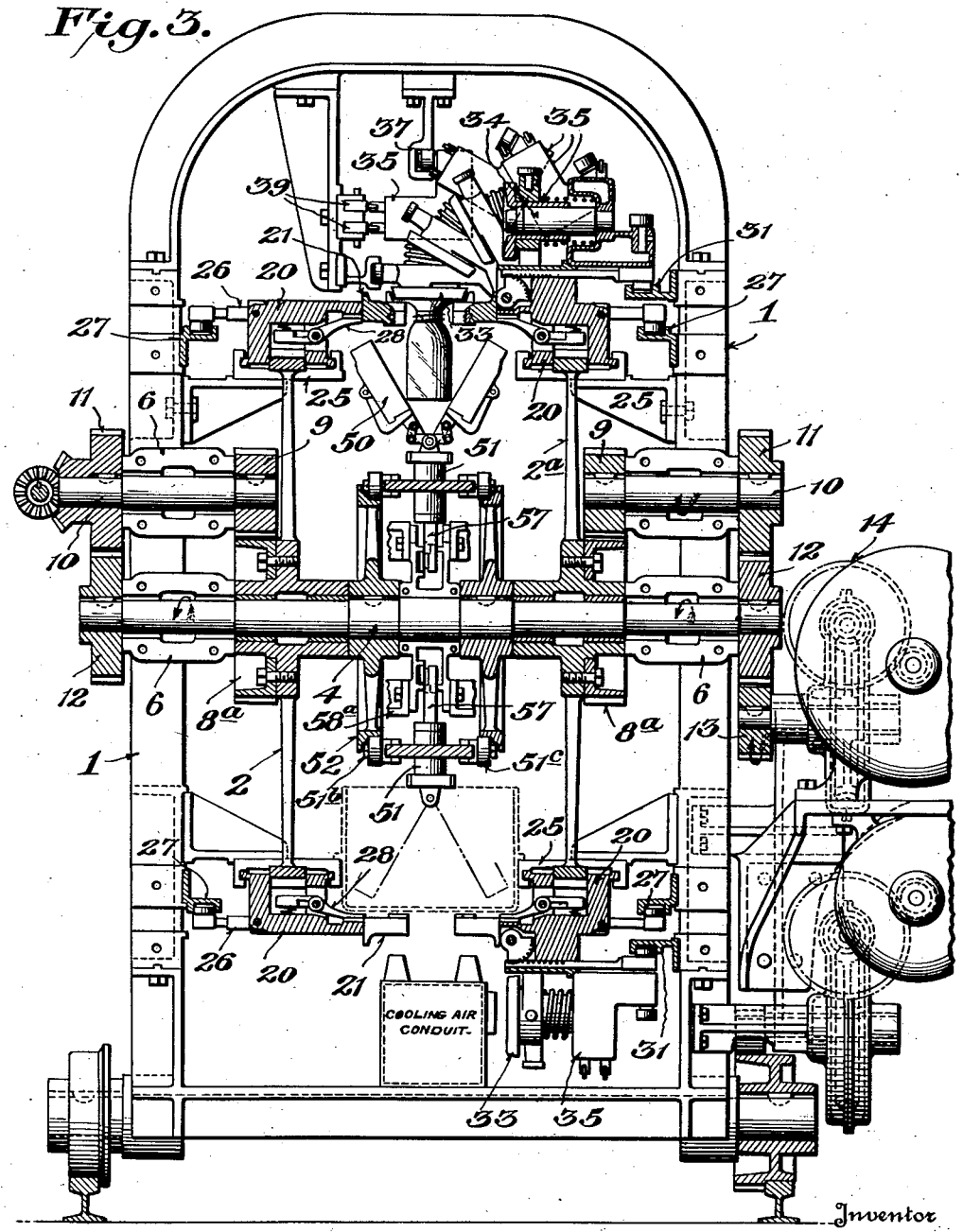
Fig. 3 is a transverse vertical section through the machine shown in Fig. 1ª taken near the delivery end thereof.

The hub of each of the wheels 2 and 2—a is provided with a gear 8ª (see Fig. 3) meshing with a pinion 9 keyed to the inner end of a transverse stub shaft 10 mounted in the corresponding side member of the frame. A gear 11 keyed upon the outside end of each stub shaft meshes with a gear 12 on the outer end of the corresponding end of the shaft 4. The sprocket 12 on the left hand end of the shaft 4 is driven through a pinion 13 by a suitable drive 14 of any approved construction. Thus the wheels 2 and 2—a are driven in unison around the supporting shaft 4 which is also being driven, but with less angular velocity.

The terms "right hand" and "left hand" will be here used for convenience to designate the two sides of the machine to be described, having reference to a point of view looking from the loading end towards the delivery end.

The conveyor system

This comprises two halves, separated on the longitudinal axis of the machine, which halves for convenience, may be designated respectively right and left hand. Each half in turn consists of a number of sections articulated together to form a chain belt 20 and glass conveying apron 21.

Each section of each half of the conveyor comprises a link block 22 connected to the blocks of each adjacent section of the same half by pivot pins 23 passing through ears 22—a on the two sides of the end of the block, and a half of an apron plate 24, the halves of the corresponding right and left hand apron plates meeting and abutting against each other in the central line of the glass-conveying apron. The front and rear edges of each apron plate are, on the straight run of the apron, close to the rear and front edges of the adjacent plates, so that the belt presents a continuous surface or apron in which there is a series of orifices 24—a, one half of each of these orifices being in each corresponding pair of apron plates and in the medial line of the conveyor at which the plates contact.

Figure 5:
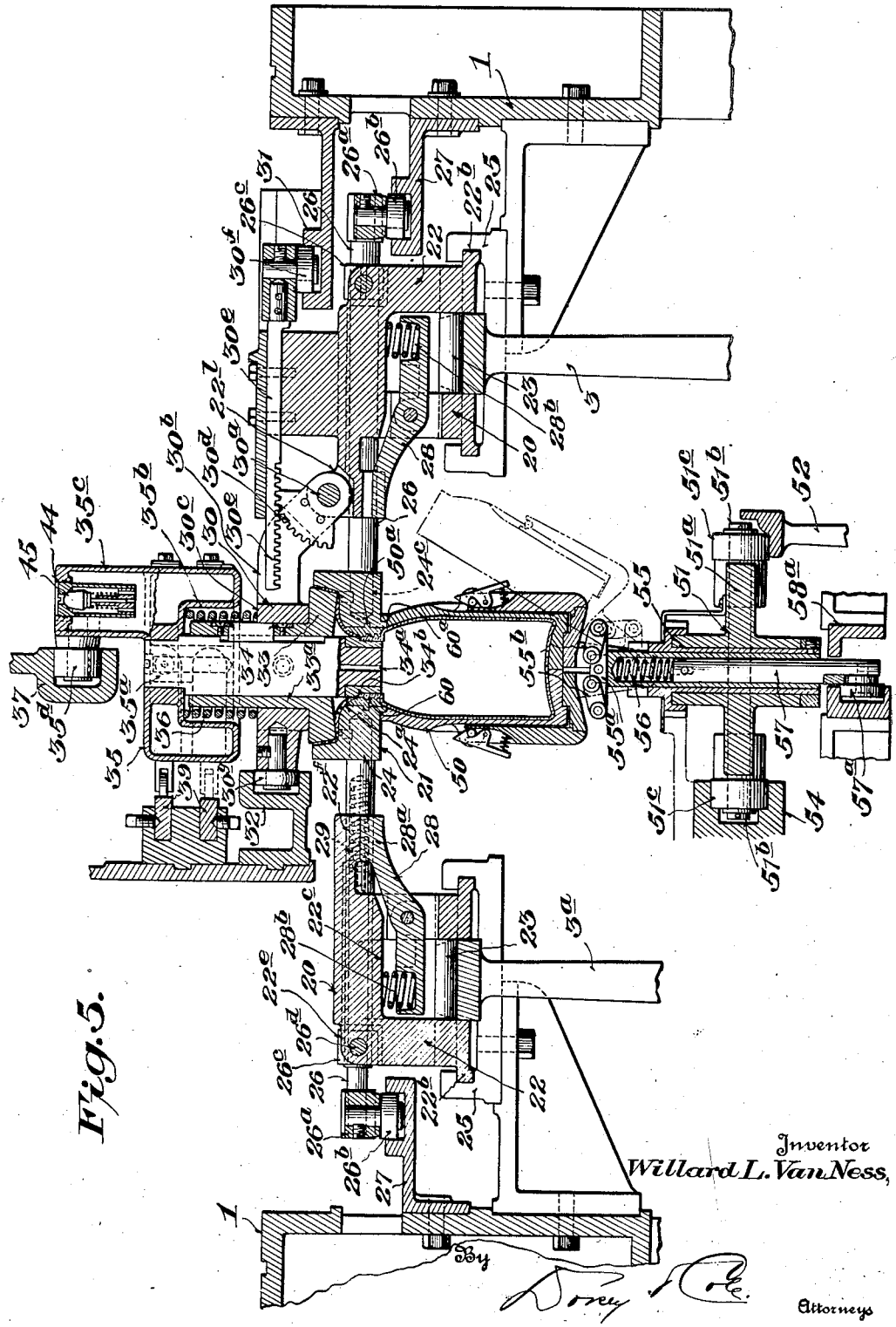
Fig. 5 is a detail vertical transverse section of the same machine.
Figure 7:
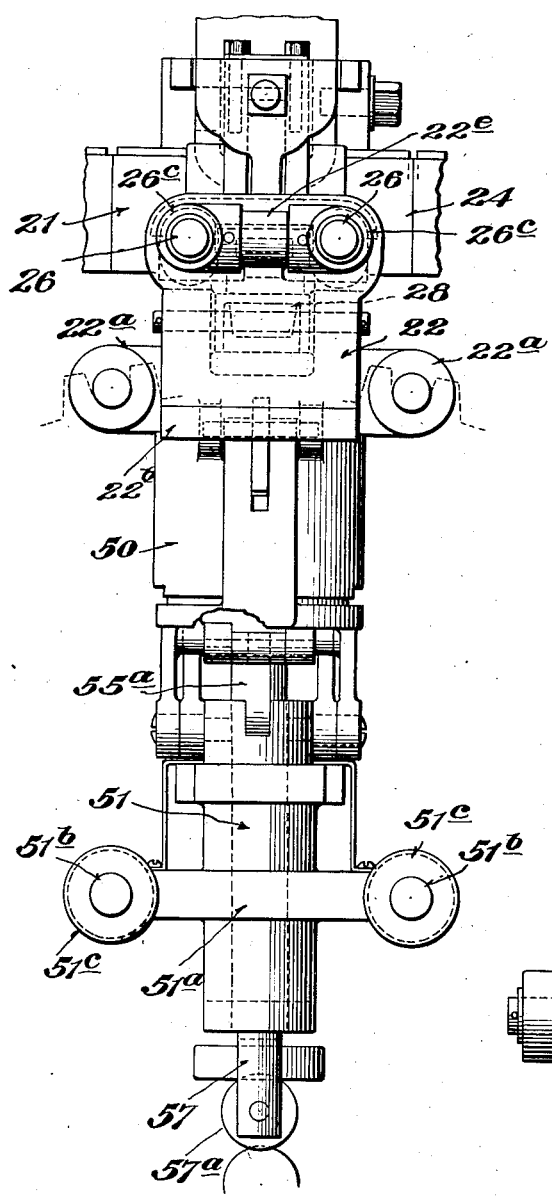
Fig. 7 is a side elevation of certain parts shown in Fig. 5.

In each apron plate above and around the upper end of the orifice therein is formed a glass receiving cavity 24—a, the contour of the cavity in vertical section being such that the shoulders of the cavity slope down towards their junction with the orifice as is shown in Figs. 5 and 15. By preference the diameters of the mouths of the cavities are substantially equal to the length of the apron plates, so that the bottom of the apron in longitudinal central sections presents a series of ridges and valleys.

Each chain 20 passes over the two sprocket wheels 2 and 3, or 2ª and 3ª, on the corresponding side of the frame.

Each link block 22 has on the inside and outside of what is its lower edge when in the upper run of the apron, between the sprocket wheels, guide flanges 22—b sliding in two oppositely faced trackways 25, the two trackways being supported by and projecting inwardly from the corresponding side members of the frame. The link blocks are longitudinally bifurcated at their bottoms, as at 22—c, as is shown in Figs. 9 and 10, to permit the rim and teeth of the sprocket wheels to enter between them and to permit the teeth to engage the articulating pins 23 and thus drive the belt.

Each link block of the left half above its lower edge, has two transverse parallel recesses 22—d therein in which are loosely mounted slides 26. The inner ends of each pair of slides carries one of the half-apron plates and the outer ends of the slides are connected by a cross head 26—a, carrying from its lower surface a roller 26—b running in a cam track 27 fastened to the frame of the machine, whereby during the travel of each conveyor section the slides will be moved transversely in and out in respect to their corresponding chain, thereby moving the corresponding apron plates towards and away from the medial line of the machine.

Each slide 26—c slidingly fits in a trunnion collar which is pivoted by a longitudinal pivot 26—d to an ear 22—e on the outside of the link block. The inner ends of the slides are normally held up against half bearings 22—f formed in a projection 22—g on the inside of the link block near its top, by half bearings 28—a on a cross head carried on the inner end of a bearing block 28 pivoted in a cross recess 22—b in the link block and having a spring 28—b interposed between the upper surface of its outer end and the head of the block. Thus the half bearings 28—a tend to lift the inner ends of the slides, and to hold up the corresponding apron plates, this being permitted by the pivotal mounting of the trunnions 26—c. However, upon undue pressure being exerted upon the upper surface of an apron plate, the latter may be depressed against the tension of the spring 28—b, thus avoiding possible breakage due to a "stone" between the apron and the forming mechanism hereinafter referred to.

The mounting of the apron plates on the right hand side of the belt is similar to that above described for the left hand side, except that instead of carrying the plates rigidly on the slides 26 they are resiliently mounted thereon, springs 29 being interposed in the connection so as to prevent possible breakage of parts if glass should enter between the halves of the plates before they are closed, and to provide a manufacturing tolerance in the machine.

I have thus provided a glass conveying apron on which a ribbon of glass may be deposited to be formed into articles at the several orifices in the apron. Obviously the forming mechanism may be varied in construction in accordance with the article to be made and the process to be employed in its fabrication.

I have in Figs. 1 to 15 of my drawings illustrated the use of my glass conveying apron in a machine adapted for the manufacture of blown wide mouth ware, such as jars. For this purpose suitable blowing mechanism and mold mechanism are necessary and these I construct as follows:

Mounted in ears 22—l on the top of the inner projection 22—g of each link block of the left hand belt is a shaft 30—a which, by means of rigid arms 30—b on its opposite ends, carries a mounting element 30 shown in the form of a plate having a bearing 30—c therein, which when the plate is horizontal, as shown in Fig. 5, is in registration with the corresponding orifice in the apron. A toothed sector 30—d fast on the shaft 30—a meshes with a rack 30—e slidingly mounted in the top of the link block, the outer end of the rack carrying a roller 30—f working in a cam track 31 carried by a bracket projecting inwardly from the left side of the frame. In the position of the mounting element 30 shown in Fig. 5, a roller 30—g on the free end thereof engages a cam-track 32 on the right hand side of the frame and thus holds the mounting plate depressed and rigid during the period of such engagement. When the roller is out of the cam-track, the mounting plate may be turned around the axis of the shaft 30—a by the outward movement of the rack under the influence of the cam-track 31 until the mounting plate assumes a substantially vertical position, as is shown in full lines in Fig. 3. The two half-apron plates of each element may be aligned by means of dowel holes and pins 24—c.

*Blowing mechanism*

Mounted in the bearing 30—c of each of the several plates 30 is a sleeve 33—a having on its lower end a collar 33 adapted to enter from above the cavity 24—b in the apron plate above and concentric with the corresponding orifice therein. The collars are in diametrical cross section sloped downwardly and outwardly, as shown in Fig. 5, so that as they descend in the recesses they squeeze or crowd the glass in the latter towards the orifices. The function of the collar is thus to feed glass to the orifice, and hence it is herein named a feeding plunger.

Mounted within the feeding plunger 33 is a neck forming plunger 34, the lower part of which is adapted to enter the corresponding orifice in the apron plates and to form and shape the upper part of the cavity of the jar. The upper end of the neck forming plunger 34 is pivotally connected at 35—a to a hollow air head 35 which is normally held up by a spiral spring 36, the base of the air head having a recess 35—b therein which surrounds the sleeve 33—a and spring 35—a.

The air head 35 is provided with an upper extension 35—c from one side of its top, the extension carrying in line with the plungers 33 and 34, a roller 35—d which, in the upper run of the conveyor apron, engages a cam-track 37. The cam-track is so shaped that at proper times it depresses the air head, whereby the neck ring plunger is projected into the orifice in the apron, as may be desired.

For the purpose of introducing blowing air into the articles, each neck forming plunger 34 is provided with an axial air passage 34—a communicating at its upper end with an air reservoir in the interior of the air head.

Considering now only a construction in which it is desired to control the admission of blowing air, the connection between the bore of the press plunger and the chamber of the air head is controlled by a blowing valve 38 mounted in the air head and actuated at proper times by a cam-track 39 carried from the right hand side of the machine frame contacting with the stem thereof.

I prefer to utilize the air head as a reservoir for storing a definite and predetermined quantity volume of air under predetermined pressure, and for this purpose I mount on the left side of the machine at the top and near the loading end a compressed air feed port 43 found in a sleeve 40—a sliding transversely of the machine in a housing 40—b carried on the frame and having a smooth head 40—c on the inner side of the housing. The sleeve 40—a is projected inwardly by a spring so that its head is pressed against the top of the extension of the air head as the latter enters onto the top horizontal run of the conveyor apron. At this time the plate mounting element 30 is vertical, so that the air head is on its side with its top surface a vertical surface adapted to make close contact with the head of the sleeve. The head of the extension has a port 44 therein controlled by a check valve 45. The interior of the sleeve communicates with a suitable source of compressed air indicated as a pipe 41, the connection being controlled by a supply valve 42, the stem of which is adapted to be struck and actuated by the roller 35—d on the head of the extension of the air chamber when the check valve in the head of such extension registers with the bore of the sleeve. Hence the chamber in the air head receives a charge of air when its extension passes the air port, and the air so stored in the chamber is then utilized in the blowing of the jar at times controlled by the opening of the blowing valve 38.

Under certain conditions it may be desirable not only to inject blowing air into the article being made but to exhaust air therefrom, and in such cases I divide the interior of the air head into two compartments, one for the compressed air as before described, and the other to form a vacuum chamber and provide, in addition to the blowing valve 38 before described, a suction valve 38—a of similar construction but differently oriented. I also provide a vacuum port 43—a, a vacuum check valve 45—a, and a vacuum supply valve 42—a corresponding respectively to the blowing port 43, the compressed air check valve 45, and the compressed air supply valve 42 above described.

*Molding mechanism*

Molding devices suitable for use with my machine may obviously assume diverse forms. In Figs. 1ª to 5 I have shown the mold mechanisms as comprising a series of finishing molds 50 divided on the longitudinal medial plane of the machine and each mold consisting of two parts pivoted to a link of a mold belt 51 travelling in a closed vertical path in the medial line of the machine and below the orifices before described. As there shown each link of the mold belt consists of a plate 51—a articulated to the plates adjacent thereto on each side by pins 51—b carrying rollers 51—c which are engaged by the teeth of the two pairs of sprocket wheels 52, 53, one pair being at each end of the operative part of the mold run and which between such pairs of wheels run in tracks 54.

The wheels 52 are fast on the shaft 4 and serve as drivers for the mold belt, the relative speed of rotation of the wheels 2, 2—a, and 52 being such as to cause the glass conveyor and the mold belt to move at the same speed. Each plate 51—a has a vertical bearing therein in which slides a sleeve 55 having a cross head 55—a on its upper end connected by links 55—b with the mold halves, so that an upward movement of the sleeve causes the mold halves to be brought together. The sleeve 55 is raised when desired to close the molds by a spring 56 located between its head thereof and the head of a pusher pin 57, the lower end of which carries a roller 57—a running in a cam-track 58 supported in the frame of the machine.

While the drives for the apron conveyor and the mold belt are of such construction and so driven that each mold on its operative run moves in unison with the cooperating orifice, in order to rigidly hold the two in registration, I prefer, as shown, to surround the lower ends of the orifices 24—a by tubular bosses 60—a, and to close the molds on such bosses, the molds being provided with seats 50—a to receive the same.

I likewise prefer to place in the orifices two-part bushings 60, which form the neck molds for the article to be fabricated.

Operation

It will be understood that the several cam-tracks hereinbefore referred to are so located along the run of the conveyor apron and mold belt and are so shaped as to actuate at the desired times and in the desired manner the several elements before described as actuated by them. With a machine so arranged and constructed the operation is as follows:

As each section of the conveyor apron rises to the upper run of the apron at the loading end of the machine, the two halves 24 of its apron plates are separated from each other and the mounting plate 30 is erect, thus removing the pressing and blowing mechanisms to the left hand side of the medial line of the apron. Thus at this time the air chamber corresponding to each section is on its side, with its smooth head vertical, and in a position on its continued forward movement to contact with and wipe across the sliding port or ports 41. During such wiping action the roller 35—d on the extension contacts with the stem of the air and/or vacuum supply valves 42 to admit and/or exhaust air from the pressure and/or vacuum chambers in the air head a definite quantity of air.

The two halves of the apron plates are now, in the continued travel of the section, brought together in the medial line of the machine, and the several plates form a practically continuous apron to receive glass which is being deposited thereon in a ribbon by any suitable device which I have not thought necessary to disclose, although I have shown the ribbon being so deposited.

The ribbon of glass is now carried forward by the apron and the glass of which it is composed sags to a certain extent through the orifices in the apron. Shortly after the receipt of the ribbon on the apron plates of any section, the mounting element 30 of that section is shifted from its vertical to its horizontal position, in which latter position it is held by the track 32. This brings the feed plunger 33 into the cavity 24—b above the corresponding orifice and crowds glass remaining in such cavity into and through the orifice to aid in supplying the quantity necessary to form the article. Shortly thereafter the air head and with it the neck forming plunger 34 are depressed by the cam-track 31. The neck ring plunger descends and in conjunction with the bushings 60 inserted in the orifice forms the neck of the jar. The blowing and/or vacuum valves 38 are now actuated to control or cause the elongation and expansion of the glass below the orifice and the finishing molds 50 close around the depending glass and the blowing is completed.

As the conveyor section approaches the delivery end of the machine, the mounting plate is swung back to vertical (in which position it remains until the section in question again reaches its upper run at the loading end of the machine), and the two halves of the apron plate open (in which position they remain until closed as before described). In the meantime the corresponding molds have opened and travel back to the beginning of their upper run. The blown article is thus left suspended from the ribbon of now solidified glass, from which the several articles have been blown. Such ribbon may be removed from the machine in any desired manner and the articles broken therefrom at the thin portion which is produced by a shoulder 34 on the neck ring plunger cooperating with the neck ring bushing.

Modifications and additional features

It is obvious from the above description that inasmuch as the molds are only in use during a portion of the upper run of the glass conveyor, that the track of the molds may only extend along the latter part of such run of the conveyor, leaving the space below the conveyor near the loading end of the machine available for different purposes. Thus I may place, as shown in Fig. 1$^b$ below the first part of the operative run of the conveyor, a belt 65 consisting of articulated plates 65—a moving in a closed vertical path, each plate being provided with an air nozzle 65—b directed upwardly towards an orifice located thereabove. Such plates in the operative run of the nozzle belt may form the top of a stationary wind chest 66 into which air under pressure is supplied. The upper part of the wind chest is divided into a series of fixed nozzles 66—a in each of which is a damper 66—b, by which the intensity of the air blast issuing from the travelling nozzles at different portions of their operative run may be controlled. Such nozzles may be used to control the elongation of the glass sagging through the orifices by partly supporting the same, and to shape it, or to cool the bottom of the sagged glass. Inasmuch as the nozzle moves with the glass and in registration therewith, the support furnished is symmetrical.

Under certain circumstances it may be also desirable to place a marvering plate 67 (see Fig. 1$^c$) beneath the orifices in the initial run of the belt conveyor to positively support the glass issuing from the orifices and to marver the same.

For the production of certain ware, such as narrow neck ware, it may be desirable to use preliminary or parison molds in addition to the finishing molds 50. In Fig. 16 I have shown such a method of fabrication. The parison molds 70 may obviously be carried on a supplemental mold belt, replacing the nozzle belt 65 shown in Fig. 1$^b$. In this procedure the gob of glass squeezed through the orifice by the feeding plunger 33 is enclosed in a parison mold, the forming plunger 34 forms the neck cavity and an initial blow is effected to shape the parison. The parison mold then opens, and the bare blank or parison is brought by the motion of the apron over the finishing mold belt and is enclosed in a finishing mold 50 carried thereon.

It is also obvious that my invention is applicable to the fabrication of ware in which stripping instead of separable molds are employed, and by pressing. Forms of this are shown in Figs. 17 and 18.

In Fig. 17 the pressing of a tumbler is shown. The flow plunger 33 is of the type before described. The molding parts include the neck ring mold 60$^a$ and a stripping mold 70$^m$, the latter being carried on the upper end of a vertical stem 70—a, sliding in a vertical elongated bearing 70—b formed in the plate 51—a of each link of a belt corresponding in position to the mold belt before described. A pusher pin 70—c projects into the bearing from its lower end and carries on its bottom a roller 70—d running in a cam-track 70—e fixed in the frame of the machine. A spring 70—f is interposed between the pusher pin and the stem to cushion the shoving up of the mold by the cam-track 70—e. No air parts are shown in this figure, as the operation indicated is a pressing one in which the article is shaped in the mold parts by the descent of the press plunger which is properly shaped for that purpose.

In Fig. 18 I have shown a stripping mold 80 which is carried by the glass conveyor, except for the rising and falling bottoms thereof. The bottom 80—a is on the upper end of a stem 80—b mounted for vertical sliding movement in a bracket 80—c depending from the lower surface of each apron plate. The lower end of the pin rides at proper times on a cam-track 81, by which the bottom is raised. This figure shows the use of a press plunger to form the mouth of the tumbler, and indicates the presence of blowing mechanism such as heretofore described.

On both Figs. 17 and 18 I have illustrated a thinning of the walls of the articles by a constriction at 82 of the neck ring to permit the article to be easily broken away from the glass above the apron.

Having thus described my invention what I claim as new and desire to secure by United States Letters Patent, is:

1. In a glass working apparatus, the combination with a travelling glass conveyor apron comprising a plurality of articulated sections, of glass working elements associated with and mounted for swinging movement on the several sections of the conveyor.

2. In a glass working apparatus, the combination with a glass conveying apron comprising a series of articulated sections, of a glass working element mounted for lateral swinging movement on each section, and means for swinging the several glass working elements on the travel of the apron.

3. In a glass working machine, the combination with a glass apron comprising two link belts, each moving in a vertical closed path extending longitudinally of the machine and parallel to the path of the other belt, and apron plates carried by links of the opposite belts meeting longitudinally of the machine and having registering orifices therein, of means for moving the plates laterally in respect to each other and to the links by which they are carried.

4. In a glass working machine; the combination with a glass conveying apron comprising a series of articulated plates, each having a concave upper surface with an orifice therein, of means for feeding a ribbon of glass to the apron, and glass feeding mechanisms moving with the plates and entering the cavities in the concave surfaces thereof.

5. In a glass forming apparatus the combination with a glass conveyor having orifices therein through which glass may sag, and having cavities above and surrounding the said orifices, and means for depositing a ribbon of glass on the conveyor.

6. In a glass forming machine the combination of a glass supporting plate having an orifice therein through which glass may sag, and having a flared cavity above and in alignment with the orifice, a mold mechanism located beneath the glass carrying plate, and glass feeding mechanism comprising a feed plunger adapted to enter the cavity and to force glass therein through the orifice.

7. An endless glass conveying apron comprising a series of articulated plates having orifices therein through which the glass may sag the said orifice being shaped to form the neck of the finished article, the plates above and surrounding the upper end of the orifices having tapered cavities therein to facilitate the flow of glass to the orifices, in combination with article shaping mechanisms moving in unison with the apron.

8. The combination with an endless glass conveying apron comprising a series of articulated plates having orifices therein through which the glass may sag and be shaped to form the necks of the finished article, the plates above and surrounding the upper end of the orifices having tapered cavities therein to facilitate the flow of glass to the orifices, of glass feeding mechanisms comprising a feed plunger adapted to enter the cavities and to force glass therein through the orifices.

9. The combination with an endless glass conveying apron comprising a series of articulated plates having orifices therein through which the glass may sag and be shaped to form the neck of the finished article, the plates above and surrounding the upper end of the orifices having tapered cavities therein to facilitate the flow of glass to the orifices, of glass feeding mechanisms comprising a feed plunger adapted to enter the cavities and to force glass therein through the orifices, and a plunger adapted to enter each orifice to form and finish the neck of the article.

10. In a glass forming mechanism the combination with an endless traveling conveyor apron having orifices therein through which glass may sag, and a marvering plate located below and in line with the path of movement of the orifice.

11. The combination with an endless glass conveying apron having orifices therein through which glass may sag, of two series of endless belts, each having a straight operative run beneath the apron and arranged one before the other, and dissimilar glass working elements carried by the two belts.

12. In a glass working machine, the combination with a travelling glass conveying apron comprising a series of articulated sections, of a glass blowing mechanism mounted on each of the several sections and comprising a travelling air reservoir, and means for successively charging the said reservoirs and utilizing the charges thereof to effect blowing.

13. In a glass working machine, the combination with a travelling glass conveying apron comprising a series of articulated sections, of blowing mechanisms mounted to swing laterally on the several sections, each blowing mechanism comprising an air reservoir and a blowing valve, and an air supply port across which the air reservoirs move in their travel with the conveyor.

14. In a glass working machine, the combination with a travelling glass conveying apron comprising a series of articulated sections, of blowing mechanisms mounted to swing laterally on the several sections, each blowing mechanism comprising an air reservoir and a blowing valve, the reservoir being provided with a check valve, and an air port across which the air reservoirs move in their travel with the conveyor, and having an air supply valve actuated on the registration of the check valve and the air port.

15. A travelling glass conveying apron comprising a series of articulated orifice plates moving in a vertical plane, each plate consisting of two halves, moving in constant registration and meeting longitudinally of the conveyor, in combination with means for moving the halves laterally towards and from each other and a spring cushioning such movement.

16. A travelling glass conveying apron comprising two halves, each half consisting of a link block articulated into a chain and an apron plate movable laterally in respect thereto, and resiliently supported hereby.

17. In a unit for a travelling glass conveyor, the combination with a link block articulated to the adjacent blocks of the conveyor, of an apron plate carried by the link block and movable laterally in respect thereto, and a resilient bearing supporting such apron plate on the link block.

18. In a unit for a travelling glass conveyor, the combination with a link block articulated to the adjacent blocks of the conveyor, of an apron plate carried by the link block and movable laterally in respect thereto, a resilient bearing supporting such apron plate on the link block, and a glass working unit mounted for lateral swinging movement on the link block.

19. An endless travelling glass conveying apron comprising a series of articulated apron plates, the apron in a straight run thereof having its surface formed into a series of valleys and ridges, with orifices in the plates at the bottoms of the several valleys.

20. The combination with an endless travelling glass conveying apron comprising a series of articulated apron plates, the apron in a straight row thereof having its surface formed into a series of valleys and ridges, with orifices in the plates at the bottom of the several valleys, of means for depositing a ribbon of glass on the apron.

WILLARD L. VAN NESS.